United States Patent [19]

Cadeddu

[11] 3,916,129

[45] Oct. 28, 1975

[54] FLUID PRESSURE DIFFERENTIAL INDICATING SWITCH WITH RESILIENT PISTON DISKS

[75] Inventor: Leonardo Cadeddu, Crema, Italy

[73] Assignee: Benditalia S.p.A., Milan, Italy

[22] Filed: Jan. 31, 1974

[21] Appl. No.: 438,491

[30] Foreign Application Priority Data
Feb. 5, 1973  Italy................................ 20003/73

[52] U.S. Cl................ 200/82 D; 340/52 C; 251/324
[51] Int. Cl............................................. H01h 35/38
[58] Field of Search....... 200/82 R, 82 D; 340/52 C; 92/192, 243, 172; 137/554, 557; 251/297, 324

[56] References Cited
UNITED STATES PATENTS

| | | | |
|---|---|---|---|
| 2,937,502 | 5/1960 | Kenyon............................ | 340/52 C |
| 3,194,608 | 7/1965 | Rich................................. | 340/52 C |
| 3,228,194 | 1/1966 | Blair................................ | 200/82 D |
| 3,382,333 | 5/1968 | Ihnacik, Jr...................... | 200/82 D |

*Primary Examiner*—Gerald P. Tolin
*Attorney, Agent, or Firm*—Ken C. Decker; William N. Antonis

[57] ABSTRACT

A fluid pressure failure detector for detecting pressure failure in a system such as a vehicle braking system having two independent fluid circuits. The detector comprises a housing in which are formed a bore and one pressure chamber at each end of the bore, a piston assembly slidably received in the bore, ports adapted to connect each pressure chamber with a respective fluid circuit, and switching means actuated in response to movement in either direction of the piston assembly as a result of a pressure difference denoting failure of one of the fluid circuits. In the invention, the bore is substantially the same length as the movable piston assembly and is smaller in cross-section than the pressure chambers, a shoulder being formed at the junction of the bore with each chamber, and a resilient disc of elastomeric material is sealingly and slidably received in each chamber, each resilient disc being partly in contact with one end of the movable piston assembly and partly in contact with the associated shoulder when the movable piston assembly is in a position such that it is entirely contained within the bore. The switching means, once actuated upon brake application when one of the fluid circuit is defective, will remain in the actuated position as long as the fault is present and return automatically to the normal position when the brakes are applied after the fault has been repaired.

7 Claims, 6 Drawing Figures

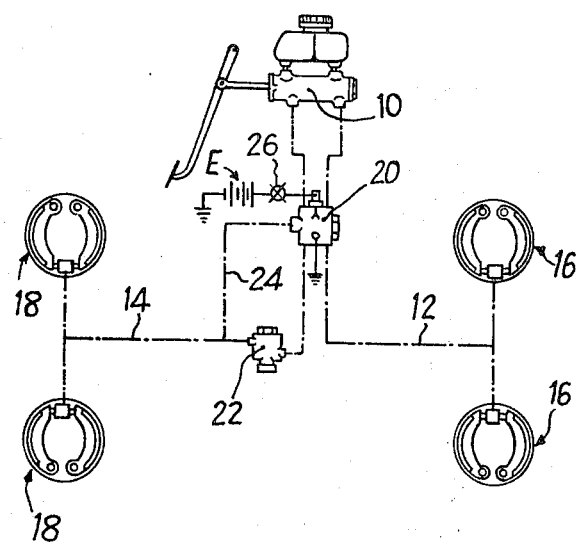
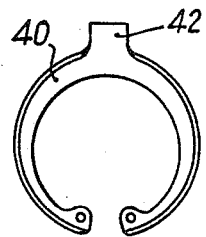
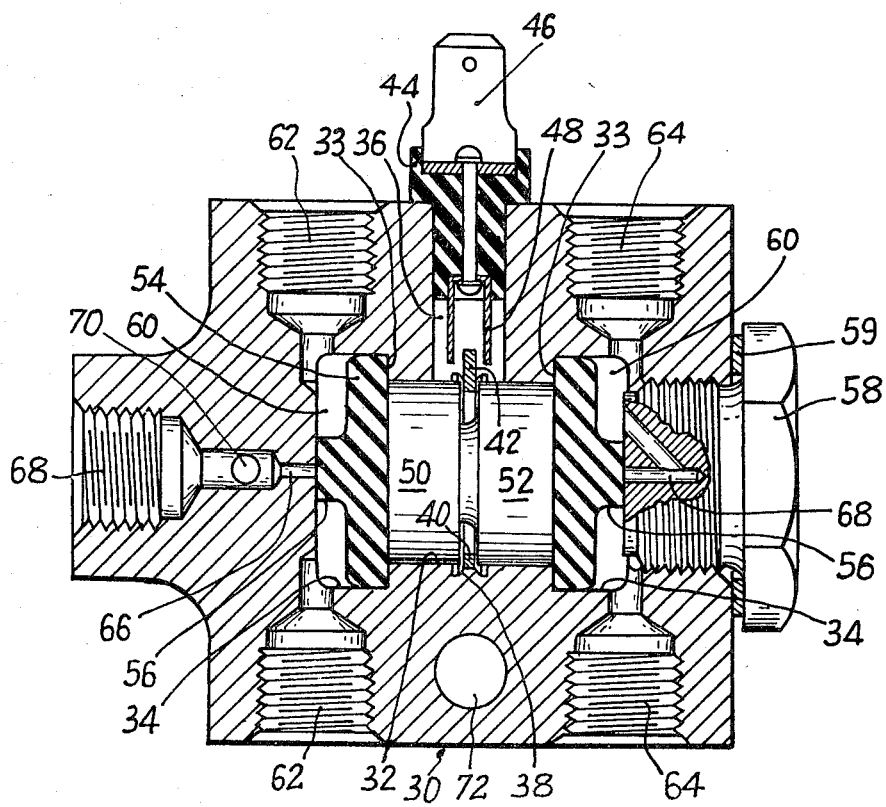

FLUID PRESSURE DIFFERENTIAL INDICATING SWITCH WITH RESILIENT PISTON DISKS

The invention relates to a fluid pressure failure detector such as those used in vehicle braking systems having two independent fluid circuits with a view to operating a warning device when one of the fluid circuits fails.

Fluid pressure failure detectors are known in which a movable piston assembly is slidable in a bore formed in a housing, the ends of the movable assembly adjoining two pressure chambers adapted to be connected to the two independent fluid circuits. Switching means are also provided for making electrical contact when the movable assembly is moved in either direction as a result of a pressure difference which denotes failure of one of the fluid circuits. Generally, the movable piston assembly slides sealingly in the bore, chiefly to prevent the electrical contacts from being contaminated with brake fluid. Fluid tightness may, for example, be obtained by means of O-ring seals. Unfortunately these seals are liable to stick to the interior of the cylinder, thus preventing the device from operating. Another disadvantage of the known devices is that the movable piston assembly may move a relatively long distance, causing a correspondingly large change in the volume of the pressure chambers, so that if the brakes are applied while one fluid circuit is faulty, a relatively large quantity of brake fluid will be drawn from the other circuit, to the detriment of the braking characteristics.

An object of the invention is to provide a fluid failure detector in which the movable piston assembly is excellently sealed against ingress of brake fluid without being liable to stick, and has a very short stroke so as to cause a very limited intake of brakes fluid.

According to the invention, the fluid pressure failure detector comprises a housing in which the bore is substantially the same length as the movable piston assembly and is smaller in cross section than the pressure chambers, a shoulder being formed at the junction of the bore with each chamber. A resilient disc of elastomeric material is sealingly and slidably received in each pressure chamber, each resilient disc being partly in contact with one end of the movable piston assembly and partly in contact with the associated shoulder when the piston assembly is in a position such that it is entirely contained within the bore.

Advantageously, a spring member is provided between each resilient disc and the end of each pressure chamber, and preferably the spring member is a boss of elastomeric material integral with the resilient disc. The boss of the resilient disc may be used advantageously to open or close a duct formed in the pressure chamber which is adapted to be connected to the brake circuit for the rear wheels of the vehicle. This duct may be connected to a line by-passing a conventional braking correction device inserted in the brake circuit for the rear wheels.

The means for making electrical contact may comprise a ring movable in response to displacement of the piston assembly and two spaced apart contact strips insulatingly secured to the housing, the strips being situated on either side of the ring. In a preferred embodiment, the outer edge of the ring is received in a circular groove formed in the bore, the groove comprising two furrows and a central rib. This embodiment enables contact to be made upon application of the brakes while one fluid circuit is faulty and to be maintained until the fault has been repaired, so as to give a continuous warning signal even in the absence of braking.

In addition, this pressure failure detector automatically resumes its normal position as pressure equilibrium is restored when the brakes are applied after repair of the fault.

The invention will now be described by way of example with reference to the accompanying figures in which:

FIG. 1 is a diagrammatic representation of a brake system having two independent circuits;

FIG. 2 is a cross-sectional view of a fluid pressure failure detector according to a preferred embodiment of the invention;

FIG. 3 shows a component used in the detector shown in FIG. 2; and

Figure 4:
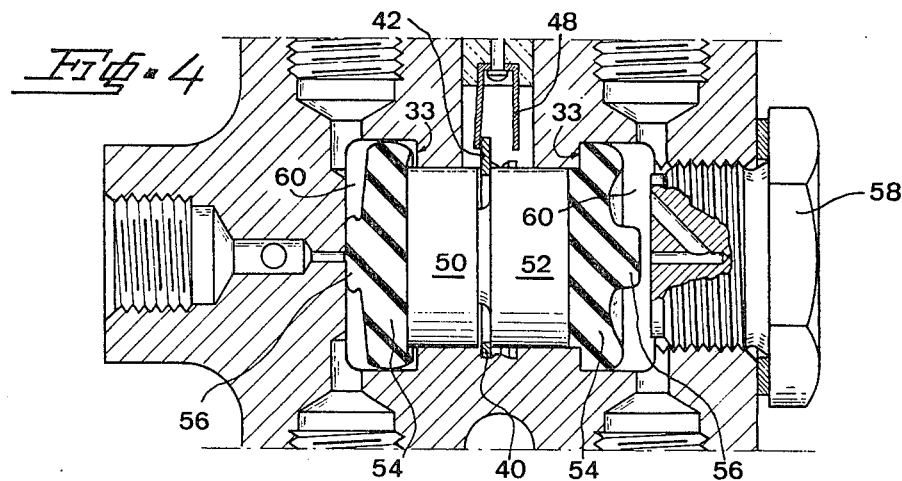
FIGS. 4, 5 and 6 are views illustrating the operation of the detector.

FIG. 1 illustrates diagrammatically a brake system having two independent fluid circuits, in which a tandem master cylinder 10 communicates through two separate lines 12, 14 fluid pressure to the brake cylinders for the front wheels 16 and to the brake cylinders for the rear wheels 18 of vehicle. The fluid supplied through the two lines 12, 14 passes through a pressure failure detector 20, and a braking correction valve 22 is inserted in the line 14 associated with the brakes of the rear wheels 18. However, under certain conditions explained below, the correcting valve 22 can be by-passed by way of a line 24. The pressure failure detector 20 includes switching means connected to an electrical warning circuit including a voltage source E, for example the battery of the vehicle, and an indicator lamp 26.

In a preferred embodiment of the invention, illustrated in FIG. 2, the pressure failure detector 20 comprises a housing 30 in which a cavity has a bore portion 32 of smaller diameter between two pressure chamber portions 34 of larger diameter. A cylindrical opening 36 extends through the wall of the housing 30 substantially in the centre of the bore portion 32. In the same region the bore portion 32 contains a circular groove 38 with a substantially W-shaped cross-section. In other words, the groove includes two furrows connected by inclined planes to a central rib. The groove 38 retains the outer edge of a resilient split ring 40, of which a tab 42 (FIG. 3) projects into the opening 36. The opening 36 is closed by electrical connecting means, comprising an insulating member 44 which insulates a connector lug 46 connected to two spaced-apart contact strips 48. When the resilient ring 40 bears on the central rib in the groove 38, as shown in FIG. 2, the contact strips 48 are on opposite sides of the tab 42 and are both spaced relative to the tab.

Two pistons 50, 52, arranged end-to-end, are slidable in the bore portion 32 of the cavity in the housing 30. A boss on the inner end face of the piston 52 creates an annular gap between the two pistons to house the inner edge of resilient ring 40. The overall length of the two pistons 50, 52 is substantially equal to the length of the bore portion 32.

Two resilient discs 54 are sealingly and slidably received in the pressure chamber portions 34 of the cavity respectively. One side of each disc is partly in contact with the outer end face of one of the pistons 50, 52 and partly in contact with the shoulder 33 formed at the junction of the bore portion 32 with the pressure chamber portion 34. The other side of each disc 54 carries an integral boss 56. One boss bears on the end of the cavity, and the other boss bears on a threaded plug 58 which closes the open end of the cavity. A seal 59 is inserted between the housing 30 and the head of the plug 58.

The spaces between each resilient disc 54 and the wall of the associated pressure chamber region 34 of the cavity form two pressure chambers 60. Chamber 60 at the blind end of the cavity (at the rear) has two ports 62 adapted to be connected to the brake circuit for the rear wheels. The chamber 60 adjacent the plug 58 (at the front) has two ports 64 adapted to be connected to the brake circuit for the front wheels. The chamber 60 at the rear is also provided with an axial passage 66, communicating with a port 68 which can be connected to the bypass line 24 (FIG. 1). The passage 66 is normally closed by the boss 56 on the rear resilient disc 54. Similarly, the boss 56 on the other resilient disc normally closes a duct 68 which is formed in the plug 58 and communicates with the front pressure chamber 60.

The housing 30 is also provided with a bleeding hole 70, giving on to the port 68, and with a hole 72 for the fixation of the detector.

During operation, when the chambers 60 are connected to their respective brake circuits 12, 14 (FIG. 1) and the connector lug 46 is connected to the electrical warning circuit, the pressure failure detector just described remains in the position shown in FIG. 2 as long as the pressure in the circuits 12 and 14 are substantially equal. A pressure difference which is too small to denote the failure of a brake circuit does not affect the position of the movable members 50, 52, since the bosses 56 formed on the resilient discs 54 act as springs and impede movement of these members. Under these circumstances the resilient disc 54 adjacent the blind end of the housing closes the axial passage 66 and therefore the line 24 which otherwise would by-pass the correcting valve 22. The pressure which the fluid in the axial passage 66 exerts on the movable members 50, 52 and 54 is balanced by the pressure which is established in the duct 68 by the fluid from the front pressure chamber 60. Since the movable members remain stationary, the split ring 40 and contact strips 48 do not make electrical contact, and the warning circuit does not give any signal.

FIG. 4 illustrates the position taken up by the movable members 50, 52 and 54 when the brake circuit 14 for the rear wheels fails, so that the fluid pressure transmitted to the front chamber 60 upon brake application is distinctly greater than that in the rear chamber 60. The pistons 50, 52 are moved to the left in the Figure, pushing the disc 54 toward the blind end of the cavity in the housing. The peripheral region of this disc has therefore moved a little off the shoulder 33, and the boss 56 on this disc is deformed as a result of being compressed on to the end of the cavity. The pressure prevailing in the front pressure chamber 60 is transmitted to the pistons 50, 52 by way of part of the resilient disc 54 which, due to resilient deformation, projects into the small-diameter bore portion 32, whereas the periphery of the disc is pressed hard on to the shoulder 33 and does not participate in the transmission of pressure. As the pistons 50, 52 are moved to the left, they move the split ring 40 into the left-hand furrow in the circular groove 38. Tab 42 of the ring 40 therefore makes electrical contact with the left-hand contact strip 48, so closing the electrical circuit and enabling it to deliver a warning signal.

When the brakes are released, the warning signal continues to be delivered, since the split ring 40 is kept in the left-hand furrow in the groove 38, in spite of the returning force exerted by the resilient disc 54 adjacent the blind end of the cavity. The disc therefore remains compressed, and its edge remains off the shoulder 33 as shown in FIG. 4.

Figure 5:
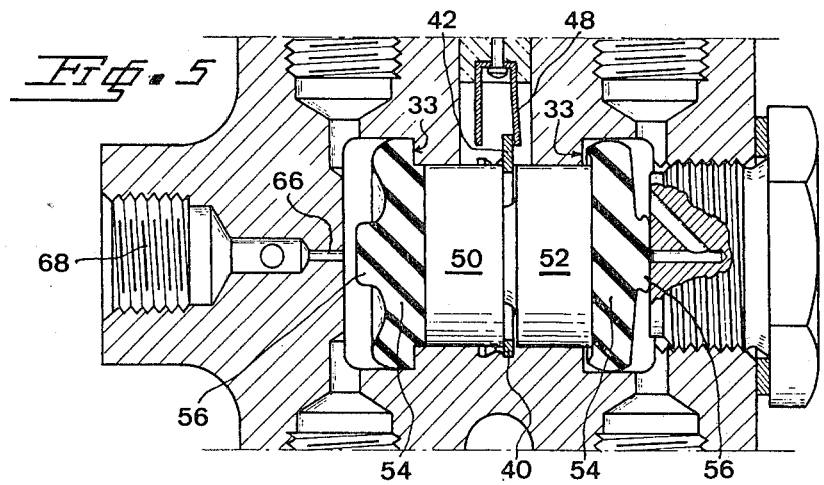

FIG. 5 shows the situation of the device when the brake circuit 12 for the front wheels is faulty. FIG. 5 is practically a mirror image of FIG. 4, as the movable members are moved to the right. The only major difference is that, whenever the brakes are applied, the movement of the rear resilient disc 54 to the right uncovers the passage 66, so that the brake fluid can by-pass the correcting valve 22 by flowing through the passage 66, port 68 and by-pass line 24.

Figure 6:
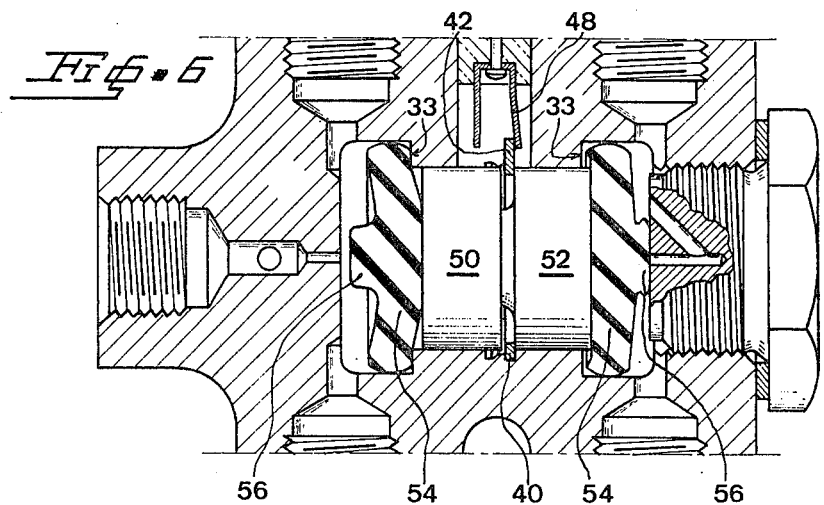

FIG. 6 illustrates the situation of the device when the brake circuit 12 for the front wheels has just been repaired and the fluid pressure in the two pressure chambers 60 are again equal. The pressure in the rear chamber 60 acts on the pistons 50, 52 by way of a relatively small central portion of the resilient disc 54 in this chamber, for the edge of this disc is bearing on the shoulder 33 and therefore does not participate in the transmission of pressure. The pressure in the front chamber, however, acts on the entire effective area of the resilient disc in this chamber. The resulting pressure differential is enough to dislodge the split ring 40 from the right-hand furrow in the groove 38, allowing for the fact that the returning force exerted by the compressed resilient disc is combined with the pressure differential. The pressure failure detector therefore returns automatically to the normal position shown in FIG. 2, when the faulty brake circuit is repaired and equal pressures are restored in the chambers 60.

The resilient discs slide in their chambers 60 with relative difficulty, so that the seal between the chambers and the central portion of the device is excellent and the electrical contact elements 40, 48 are unlikely to be contaminated by brake fluid. In the event of failure of one of the brake circuits, moreover, the quantity of fluid absorbed due to the changed volumes of the pressure chambers 60 is very small, since the changes result from a relatively small movement of the resilient discs 54.

Obviously, only the preferred embodiment of the pressure failure detector has been described, and if necessary certain elements may be omitted by applying the rules of the art. In particular, the cavity in the housing 30 may be open at both ends, each end being closed by a threaded plug. The by-pass passage 66 may be omitted, in which case it is unnecessary to provide a corresponding duct such as the duct 68 in the plug 58. Each contact strip 48 may be connected to its own connector lug. Also, the electrical contact system may be replaced by any known system of sliding, plunger or rocking contacts. Similarly, the resilient discs 54 need not bear bosses 56, and the bosses may be replaced with spring if desired.

I claim:

1. A fluid pressure failure detector detecting pressure failure in a system having two independent fluid circuits, comprising:
a housing having formed therein a bore and one pressure chamber at each end of said bore, the bore being smaller in cross-section than the pressure chambers to define a pair of shoulders at the junctions of the ends of the bore with the corresponding pressure chambers;

ports connecting each pressure chamber with one of said fluid circuits;

a movable piston assembly slidably received in said bore, said piston assembly being substantially the same length as said bore;

a pair of resilient discs of elastomeric material, the outer circumferential surface of each disc being sealingly and slidably received in one of said pressure chambers with a peripheral portion of one face of each of the discs engaging a corresponding one of said shoulders and the remaining portion of said one face of each of the discs engaging one end of said piston assembly and switching means operatively connected to said housing and said piston assembly and actuated in response to movement in either direction of the piston assembly as a result of a pressure difference denoting a failure in one of said fluid circuits.

2. A detector as claimed in claim 1, wherein a spring member is provided between each resilient disc and the end of each pressure chamber.

3. A detector as claimed in claim 2, wherein the spring member is a boss of elastomeric material integral with the resilient disc and having a surface bearing on the end of the associated pressure chamber.

4. A detector as claimed in claim 3, wherein a passage is formed in the end of at least one pressure chamber, at the place which is engaged by the boss.

5. A detector as claimed in claim 1, wherein the switching means comprise a ring movable with the movable piston assembly and two spaced apart contact strips insulatingly secured to the housing, the ring being situated between the strips and spaced from the strips when the piston assembly is in the position in which it is entirely contained within the bore.

6. A detector as claimed in claim 5, wherein the outer edge of the ring is received in a circular groove formed in the bore, the groove comprising two furrows connected by inclined surfaces to a central rib and the inner edge of the ring is retained in a space situated between two cylindrical members which make up the movable piston assembly.

7. The invention of claim 4, wherein another passage is formed in the end of the other pressure chamber and communicating with the latter, one end of said another passage entering said other pressure chamber at the place where the corresponding boss engages the wall of the other pressure chamber.

* * * * *